United States Patent
Heo et al.

(10) Patent No.: US 10,805,926 B2
(45) Date of Patent: Oct. 13, 2020

(54) SYSTEMS, METHODS, AND DEVICES FOR PROXIMITY SERVICES FOR MULTI-CARRIER CAPABLE MOBILE DEVICES

(71) Applicant: Apple Inc., Cupertino, CA (US)

(72) Inventors: Youn Hyoung Heo, Seoul (KR); Richard C. Burbidge, Shrivenham (GB); Hong He, Beijing (CN); Mo-Han Fong, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 194 days.

(21) Appl. No.: 14/671,998

(22) Filed: Mar. 27, 2015

(65) Prior Publication Data

US 2016/0044552 A1 Feb. 11, 2016

Related U.S. Application Data (60) Provisional application No. 62/034,705, filed on Aug. 7, 2014.

(51) Int. Cl.
*H04W 72/04* (2009.01)
*H04W 76/14* (2018.01)
(Continued)

(52) U.S. Cl.
CPC ......... *H04W 72/0453* (2013.01); *H04L 5/001* (2013.01); *H04L 5/0032* (2013.01);
(Continued)

(58) Field of Classification Search
CPC . H04W 72/0453; H04W 4/008; H04W 8/005; H04W 48/20; H04W 76/023
See application file for complete search history.

(56) References Cited

U.S. PATENT DOCUMENTS

| | | | |
|---|---|---|---|
| 2010/0061294 A1* | 3/2010 | Proctor, Jr. | ........ G06Q 30/0226 370/328 |
| 2011/0228666 A1 | 9/2011 | Barbieri et al. | |

(Continued)

FOREIGN PATENT DOCUMENTS

| | | |
|---|---|---|
| EP | 2892287 A1 | 7/2015 |
| EP | 2903392 A1 | 8/2015 |

(Continued)

OTHER PUBLICATIONS

Catt, "On D2D Communication," R1-131897, 3GPP TSG RAN WG1 Meeting #73, Fukuoka, Japan, May 20-24, 2013, 6 pages.

(Continued)

*Primary Examiner* — Brandon M Renner
(74) *Attorney, Agent, or Firm* — Stoel Rives LLP (57) ABSTRACT

A user equipment (UE) is configured to perform cell selection and camp on a first cell in a first frequency resource. The UE is configured to determine that proximity services are supported in a second frequency resource. The first and second wireless frequency resources are within licensed spectrums corresponding to one or more mobile communications networks. The UE is configured to start device-to-device communication on the second frequency resource and send, with the transceiver, a device-to-device message in the second frequency resource. The device-to-device message includes one of a device-to-device discovery message and a device-to-device communication message.

20 Claims, 6 Drawing Sheets

(51) Int. Cl.
  *H04W 4/80* (2018.01)
  *H04W 8/00* (2009.01)
  *H04W 48/20* (2009.01)
  *H04L 5/00* (2006.01)

(52) U.S. Cl.
  CPC .......... *H04L 5/0069* (2013.01); *H04L 5/0091* (2013.01); *H04W 4/80* (2018.02); *H04W 8/005* (2013.01); *H04W 48/20* (2013.01); *H04W 76/14* (2018.02); *H04L 5/0023* (2013.01)

(56) References Cited

U.S. PATENT DOCUMENTS

| | | |
|---|---|---|
| 2013/0315152 A1 | 11/2013 | Ratasuk et al. |
| 2014/0204847 A1 | 7/2014 | Belleschi et al. |
| 2014/0206322 A1 | 7/2014 | Dimou et al. |
| 2015/0201023 A1* | 7/2015 | Kotab ............... H04L 65/60 709/208 |
| 2015/0289305 A1 | 10/2015 | Tong et al. |
| 2016/0029359 A1* | 1/2016 | Agiwal ............ H04W 72/04 370/329 |
| 2017/0135074 A1* | 5/2017 | Yi ..................... H04W 8/005 |
| 2017/0223757 A1* | 8/2017 | Tsuboi ............. H04W 76/021 |

FOREIGN PATENT DOCUMENTS

| | | |
|---|---|---|
| EP | 3319394 A1 | 5/2018 |
| TW | 201406191 A | 2/2014 |
| TW | 201424441 A | 6/2014 |
| WO | 2014012457 A1 | 1/2014 |
| WO | 2014034573 A1 | 3/2014 |
| WO | 2014050886 A1 | 4/2014 |
| WO | 2014051126 A1 | 4/2014 |
| WO | 2014073539 A1 | 5/2014 |

OTHER PUBLICATIONS

PCT/US2015/036261, International Search Report and Written Opinion, dated Oct. 16, 2015, 13 pages.
"Network configurations for model operation", R2-142636, 3GPP TSG-RAN WG2 #86, Seoul, Korea, Agenda Item 7.4.2.2, May 19-23, 2014, 4 pages.
Intel Corporation, "Discussion on D2D Multicarrier Capabilities", R1-142316, 3GPP TSG RAN WG1 Meeting #77, Seoul, Korea, Agenda Item 6.2.5.4, May 19-23, 2014, 4 pages.
Kyocera, "Inter-frequency discovery considerations", R2-142240, 3GPP TSG-RAN WG2 #86, Seoul, Republic of Korea, Agenda Item 7.4.3.1, May 19-23, 2014, 10 pages.
NTT Docomo, Inc., "Discussion on Inter-cell and Inter-carrier D2D", R1-142270, TSG RAN WG1 Meeting #77, Seoul, Korea, Agenda 6.2.5.3.3, May 19-23, 2014, 6 pages.
Catt, "D2D discovery during mobility and RLF", R2-142099, 3GPP TSG RAN WG2 Meeting #86, Seoul, Korea, Agenda Item 7.4.3.1, May 19-23, 2014, 6 pages.
Intel Corporation, "Resource allocation for D2D discovery", R2-133512, 3GPP TSG-RAN2 Meeting #83bis, Ljubljana, Slovenia, Agenda Item 7.5.1, Oct. 7-11, 2013, 5 pages.
Qualcomm Incorporated, "Interaction of RRC with other layers for ProSe Direct Discovery", R2-142555, 3GPP TSG-RAN WG2 #86, Seoul, South Korea, Agenda Item 7.4.3.1, May 19-23, 2014, 6 pages.
"D2D operation upon mobility", R2-142627, 3GPP TSG-RAN WG2 #86, Seoul, Korea, Agenda Item 7.4.2.2, May 19-23, 2014, 2 pages.
"Prioritized reselection of D2D support frequency", R2-142631, 3GPP TSG-RAN WG2 #86, Seoul, Korea, Agenda Item 7.4.2.1, May 19-23, 2014, 3 pages.

* cited by examiner

SYSTEMS, METHODS, AND DEVICES FOR PROXIMITY SERVICES FOR MULTI-CARRIER CAPABLE MOBILE DEVICES

RELATED APPLICATION

This application claims the benefit under 35 U.S.C. § 119(e) of U.S. Provisional Application No. 62/034,705, filed Aug. 7, 2014, which is incorporated by reference herein in its entirety.

TECHNICAL FIELD

The present disclosure relates to device-to-device communication and more particularly relates to enabling device-to-device communication in a frequency different than a current camping or serving cell frequency.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN) according to LTE, the base station is termed Evolved Universal Terrestrial Radio Access Network (E-UTRAN) Node B (also commonly denoted as evolved Node B, eNodeB, or eNB). A base station may communicate with a wireless communication device, known as user equipment (UE) in LTE. Although the present disclosure is presented with terminology and examples generally directed towards 3GPP systems and standards, the teaching disclosed herein may be applied to any type of wireless network or communication standard.

Figure 1:
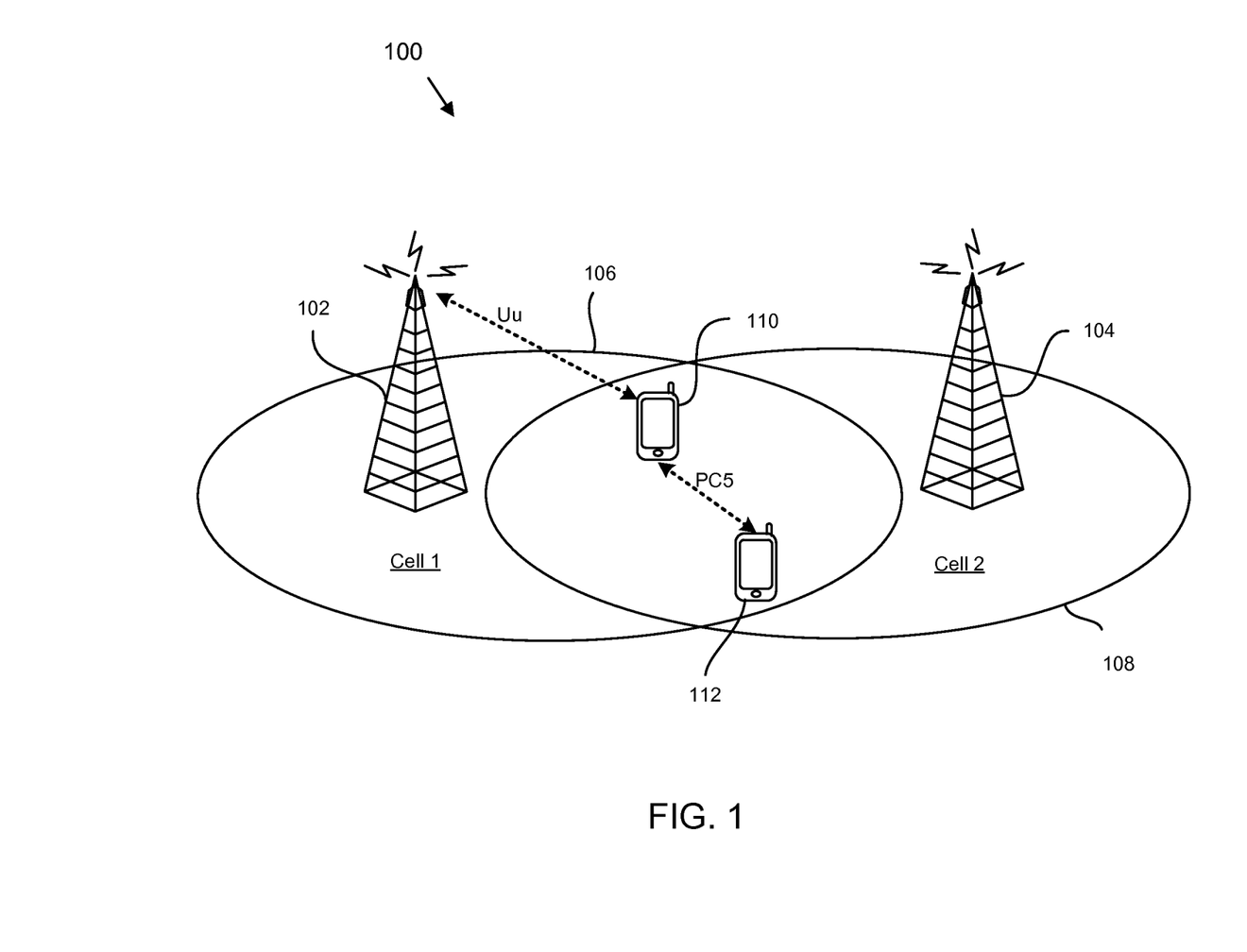
FIG. 1 is a schematic diagram illustrating a communication system consistent with embodiments disclosed herein.

FIG. 1 is a schematic diagram illustrating a communication system 100 that includes a first eNB 102 and a second eNB 104 that provide communication services to a first UE 110 and a second UE 112. The eNBs 102, 104 and UEs 110, 112 may include radios and antennas that are configured to transmit and receive signals in one or more frequencies within licensed and unlicensed wireless spectrums. The eNBs 102, 104 provide coverage within coverage areas 106 and 108, respectively. When in coverage, the UEs 110, 112 may communicate with the eNBs 102, 104 using a Uu air interface on a licensed cellular spectrum. The UEs 110, 112 may communicate with each other via the eNBs 102, 104, as well as via any intervening evolved packet cores (EPCs). A downlink (DL) transmission (Tx) in an LTE network can be defined as a communication from one of the eNBs 102, 104 to at least one UE 110, 112, and an uplink (UL) transmission can be defined as a communication from a UE 110, 112 to one of the eNBs 102, 104. In addition to DL and UL transmissions over the Uu interface, the UEs 110, 112 may also communicate directly with each other over a direct air interface (denoted by PC5 interface in FIG. 1). Direct communication between devices, such as the UEs 110, 112, is commonly known as proximity services (ProSe) communication, device-to-device (D2D) communication, side-link direct communication, or peer-to-peer (P2P) communication. In D2D, the UEs 110, 112 are able to communicate directly with each other without routing communications via one of the eNBs 102, 40 or a core network, as illustrated by the PC5 interface in FIG. 1. 1. In one embodiment, the first eNB 102 in cell 1 communicates using a first frequency f1 while the second eNB 104 communicates using a second frequency f2.

Proximity-based discovery and D2D communication between devices (UEs) have gained strong interest in recent years as they enable a network operator to reduce a load on a core network or a RAN, increase data rates due to direct and short communication paths, provide public safety communication paths, provide for social interactions, and numerous other functionality. In some embodiments, the UEs 110, 112 and eNBs 102, 104 may be connected to completely different networks operated by different mobile network operators (MNOs).

There are various alternatives to realize such a direct communication path between mobile devices. In one embodiment, the D2D air interface PC5 could be realized by some type of short-range technology, such as Bluetooth or Wi-Fi, or by reusing licensed LTE spectrum, such as a UL spectrum. Furthermore, D2D communications can be generally divided into two parts. The first part is device discovery, whereby the UEs 110, 112 are able to determine that they are within range and/or available for D2D communication. Proximity detection may be assisted by network infrastructure, may be performed at least partially by the UEs 110, 112, and/or may be performed largely independent of the network infrastructure. The second part is direct communication, or D2D data communication, between the UEs 110, 112, which includes a process to establish a D2D session between the UEs 110, 112 as well as the actual communication of user or application data. D2D communication may or may not be under continuous control of a network. For example, the UEs 110, 112, may not need to have an active connection with one of the eNBs 102, 104 in order to take part in D2D communications.

Wide area network (WAN) communication, such as LTE communication, and ProSe communication may operate either on the same carrier or different carriers depending on a reception/transmission (Rx/Tx) capability of a UE. If a UE has multiple Rx/Tx chains (e.g., a UE is a multi-carrier capable device), the UE may operate ProSe communication on one frequency also supporting WAN communication on another frequency or frequencies. Thus, a UE may be able to simultaneously maintain both WAN and ProSe communication sessions or, in one embodiment, send or receive a WAN communication while sending or receiving a ProSe communication.

In a ProSe work item in 3GPP, it is assumed that ProSe are supported in a UL spectrum using frequency division duplexing (FDD) or in UL subframe(s) in time division duplexing (TDD) and a new interface (known as PC5) is being standardized (see Revised Work Item Description (WID): LTE Device to Device Proximity Services, RP-142043 based on the 3GPP TSG RAN meeting #66 of 11 Dec. 2014). This means that Tx and Rx over PC5 occur on a single carrier frequency using UL spectrum in FDD or a UL subframe in TDD, but WAN may operate in either a TDD or FDD mode. In case of TDD, ProSe Tx/Rx shares the timeslots allocated by the network for WAN UL communication, and for FDD the ProSe Tx/Rx shares the carrier used for WAN UL communication.

There are many WAN-ProSe combinations that can be potentially considered. A first combination is a single carrier WAN-ProSe combination. In this combination, it might be assumed that WAN and ProSe operate on the same carrier and share spectrum resources. This means that in case of TDD spectrum, the WAN UL, ProSe Tx, and ProSe Rx need to be multiplexed in time. The WAN DL and ProSe Tx/Rx are multiplexed in time by default since ProSe operates only in UL subframes. In the case of FDD, there may be a single Rx chain or dual Rx chains. In the case of a single Rx chain, the single Rx chain is used for WAN DL reception and ProSe reception (i.e., one Rx chain is shared for reception on DL and UL frequencies) and thus UE cannot simultaneously receive WAN DL communications and ProSe communications. For example, WAN DL Rx and ProSe Rx are multiplexed in separate non-overlapping time slots. In the case of a dual Rx chain, the UE is equipped with an additional Rx chain (baseband and radio frequency (RF)) that may be utilized for ProSe reception. With this additional Rx chain, the UE may be able to simultaneously receive a WAN DL Tx and ProSe Tx carried on a WAN UL carrier. For example, WAN DL and ProSe Rx may be received simultaneously in one time slot.

A second WAN-ProSe combination is a multi-carrier WAN-ProSe combination (e.g., carrier aggregation (CA)). In this combination, it might be assumed that WAN operates on one or multiple component carriers and ProSe operate on one of the component carriers. The component carriers for ProSe may or may not be a part of WAN component carriers. Two main scenarios, in terms of WAN-ProSe CA combinations, include the use of a dedicated ProSe carrier or the use of a shared WAN and ProSe carrier. In a dedicated ProSe carrier WAN-ProSe CA scenario, a first component carrier (CC1) is configured for WAN communication and the second component carrier (CC2) is used for ProSe communication. In this case, a dual radio-receiver uses an eNB-UE air interface on CC1 for WAN communication and a UE-UE air interface on CC2 for direct communication. Note that from a system perspective, the CC2 may be used for WAN communication as well, but from a given UE perspective, the WAN transmission and reception on CC2 may be off.

In a shared WAN and ProSe carrier WAN-ProSe CA scenario, a primary cell (PCell) WAN operating on component carrier CC1 may be configured for WAN communication only and a secondary cell (SCell) WAN operating on component carrier CC2 is used for WAN and ProSe. In this case, the SCell operation, in one embodiment, is similar to a single carrier WAN-ProSe. If a dual Rx chain UE is used in the shared WAN and ProSe carrier WAN-ProSe carrier aggregation scenario, WAN DL communications on CC2 and ProSe Rx communications on CC2 may be multiplexed in separate non-overlapping time slots. The separate non-overlapping time slots may be needed since only WAN DL on the PCell and either ProSe Rx or WAN DL on the SCell can be received simultaneously (1 WAN DL on the PCell+1 WAN DL or 1 ProSe Rx on the SCell for carrier aggregation). Another constraint is that WAN UL communications on the PCell and ProSe Tx communications on the SCell may need to be multiplexed in separate non-overlapping time slots in order to avoid simultaneous transmissions on multiple carriers (i.e., 1 WAN UL on the PCell+1 ProSe Tx on the SCell for carrier aggregation). The 3GPP RAN1 working assumption is that this case is not supported if a UE is capable of 2 DL carrier aggregation (without ProSe operation).

If a triple Rx chain UE is used in the shared WAN and ProSe carrier WAN-ProSe carrier aggregation scenario, WAN DL communications on the PCell, WAN DL on the SCell, and ProSe Rx communications on the SCell can be received simultaneously (a total of 2 WAN DL communications on the PCell and the SCell+1 ProSe Rx on the SCell carrier aggregation). This may be considered as a special form of triple carrier aggregation. However, WAN UL communications on the PCell and ProSe Tx on the SCell need to be multiplexed in separate non-overlapped time slots in order to avoid simultaneous transmissions on multiple carriers (i.e., 1 WAN UL on the PCell+1 ProSe Tx on the SCell).

In light of the foregoing, the present disclosure discloses detailed procedures and signaling to enable a UE to support ProSe in a different frequency from the frequency that the UE is connected for LTE service.

According to one embodiment, a UE includes a transceiver configured to perform cell selection and camp on a cell in a first frequency resource that meets cell selection/reselection criteria. If the first frequency does not support ProSe, the UE determines that proximity services are supported in a second frequency resource. In one embodiment, the first and second wireless frequency resources may be within licensed spectrums or unlicensed spectrums. The one or more processors are configured to cause the UE to start D2D communication on the second frequency resource and send, with the transceiver, a D2D message in the second frequency resource. The D2D message includes one of a D2D discovery message and/or a D2D communication message.

Example operation, signaling, and functionality of UEs or eNBs to operate WAN and ProSe in different carriers in cases where a UE is in a radio resource control (RRC) idle mode, an RRC connected mode, or an RRC connected mode with ProSe in an SCell is discussed below. These cases are given for illustration purposes only. Except where otherwise noted, the example operation, signaling, and functionality disclosed in each case may be applied to any other case.

In one embodiment of a first case, a UE may be configured to enable proximity services while the UE is in an RRC idle mode (RRC_IDLE) on a cell in the first carrier. For example, while the UE camps on a cell in one frequency carrier (f1), the UE may want to support ProSe on a cell in another frequency carrier (f2). Since we assume that a UE is capable of multiple receive (Rx) and transmit (Tx) chains, it would be possible for the UE to support ProSe on f2 even though the UE camps on f1. For example, the UE may be able to perform sidelink direct communication while in an RRC idle mode on a cell or be able to perwform direct communication on a cell other than a PCell in RRC connected mode. As another example, lower layers may be configured to transmit sidelink control information in resources indicated by a cell other than a PCell. This may allow a UE to support simultaneous WAN and ProSe communication or allow the UE to change cells or frequencies to a cell or frequency that supports ProSe communication.

In order to know ProSe resource information, the UE may receive system information from the cell on f2. For ProSe, a ProSe-related system information block (SIB) and common radio resource information may be sufficient. If a mode 2 Tx resource pool (distributed resource allocation mode for ProSe direct communication) or a Type 1 Tx resource pool (distributed resource allocation type for ProSe discovery) is configured, the UE assumes that it is allowed to enable ProSe transmission on the cell in f2 while camping on another cell in f1. In distributed resource allocation mode, the UE selects resources in the configured resource pool without dynamic grant from the eNB.

However, the ProSe supporting cell may indicate that the UE must enter an RRC connected mode (RRC_CONNECTED) before the UE can perform ProSe transmissions. For example, the UE may be required to enter RRC connected mode in order to be provided with the appropriate transmission resources. The ProSe supporting cell may indicate that RRC connected mode is required by indicating that one or more of a mode 2 Tx resource pool or a Type 1 Tx resource pool are not configured.

If an RRC connected mode is required before performing ProSe transmissions, the UE may initiate RRC connection setup in the current serving cell in f1 (a first frequency). In one embodiment, after setting up an RRC connected mode, the UE sends UE assistance information indicating that the UE wants to support ProSe on f2 (a second frequency). If the serving eNB in f1 receives UE assistance information, the eNB can handover the UE to a corresponding cell in f2. The UE assistance information may include the desired target cell information (e.g. physical cell identifier (ID) and frequency information). In one embodiment, if the cell in f1 and the cell in f2 belong to the same eNB, the eNB may allocate ProSe resources for f2 cell via RRC signaling on the f1 cell. In addition to the indication that the UE wants to support ProSe on f2, the UE may inform the eNB about the frequencies on which the UE can support ProSe in parallel with WAN operation (on same or different frequencies). This may assist the eNB in making a decision to handover the UE to a cell in f2 or allocate the ProSe resources on f2 in parallel with maintaining WAN operation on f1.

If the UE receives ProSe SIB from an eNB corresponding to the cell on f2 that indicates that entry into RRC connected mode is required, the UE may perform cell reselection and give higher priority to f2 by which the UE selects the cell in f2. After cell reselection, the UE initiates RRC connection setup procedure. Cell reselection may allow the UE to select f2 without being handed over by the cell on f1.

As described above, the UE may want to use ProSe in a cell on a carrier frequency (f2) different than the frequency on which it is camping (f1). In one embodiment, the UE receives system information from the cell on f2 in order to determine how to proceed. In order to receive the system information, the UE needs to select the cell on f2 from which it is going to receive system information. In some embodiments, it would be preferable if the cell selected on f2 corresponds to the same eNB on which the UE would camp if the UE would camp on a cell on f1. This may help ensure that the UE receives the radio resource information from the most appropriate cell. In one embodiment, selecting the cell on f2 corresponding to the same eNB as the cell on f1 can be achieved by the UE performing an intrafrequency cell reselection process among the cells of f2 (in a similar way to the intrafrequency cell reselection process it performs on f1 to determine the camped cell). For example, when a UE is interested to perform proximity services direct communication on non-serving frequency, it may perform measurements on that frequency for cell selection and intrafrequency reselection purposes. In one embodiment, however, this intrafrequency cell reselection process may impose radio measurement and processing demands on the UE that are not desirable in terms of UE power consumption. Hence, a simplified cell selection process may be applied in some situations. In one embodiment, for example, the UE selects the cell with the best reference signal received power (RSRP) or reference signal received quality (RSRQ) measurement.

In one embodiment, before a UE camped on f1 can use ProSe on f2, the UE needs to determine that frequency f2 supports ProSe. The UE may determine this by performing a search of other frequencies, selecting a cell on each frequency and reading system information. However, this may impose unnecessary processing demands on the UE with a negative impact on power consumption. In one embodiment, to avoid these processing demands, the serving cell on f1 advertises in broadcast system information that ProSe resources are available on frequency f2. The advertisement could be a single bit flag within an intrafrequency carrier list, or it could be a separate list of frequencies that support ProSe. The single bit flag could be extended to indicate whether the ProSe resources available on that frequency are for discovery and/or direct communication.

Figure 2:
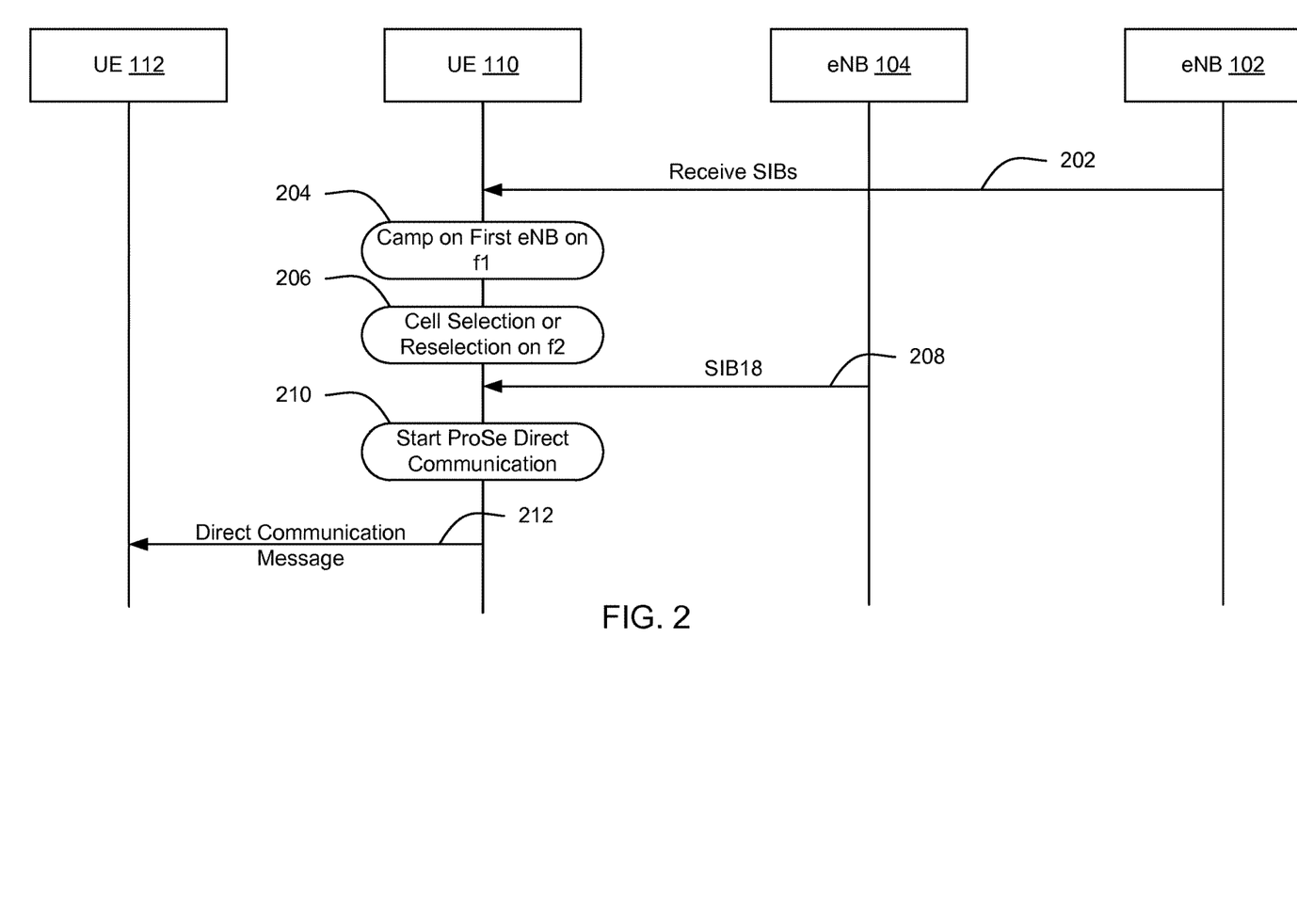
FIG. 2 is a schematic diagram illustrating a call flow for enabling proximity services consistent with embodiments disclosed herein.

FIG. 2 illustrates a call flow for enabling proximity services on a second frequency while a UE 110 is in an RRC idle mode on a first frequency, according to one embodiment. The call flow illustrates example communication between the first eNB 102, second eNB 104, first UE 110, and second UE 112 of FIG. 1. For example, the first eNB 102 may provide communication services in a first frequency while the second eNB 104 may provide communication services in a second frequency.

The UE 110 receives SIBs from the eNB 102 at 202 and camps on the first eNB 102 in a first frequency f1 at 204. At 206, the UE 110 performs a cell selection or reselection procedure to select a cell corresponding to the second eNB 104 on a second frequency f2. For example, the proximity services may not be available on the first frequency but are available on the second frequency f2. The UE 110 may perform the cell selection or reselection at 206 in response to determining that ProSe services are available on f2 and/or determining that higher layers are requesting direct communication or other proximity services.

At 208, the UE 110 receives an SIB (SIB18, in the depicted embodiment). In one embodiment, the SIB18 includes information about neighboring PLMN IDs. In one embodiment, the SIB18 includes information about D2D resource allocation for discovery or communication. In one embodiment, SIB18 may indicate whether mode 2 or Type 1 Tx resource pool allocations are configured for the eNB 104. The UE 110 starts ProSe direct communication (discovery or data communication) at 210. At 212, the UE 110 sends a direct communication message, which may include user or control data. For example, the direct communication message may include application layer data for direct communication between the UE 110 and UE 112.

In one embodiment of a second case, a UE may be configured to enable proximity services while the UE is in an RRC connected mode on a first cell. For example, the UE may be connected to a serving cell in f1, and be interested in supporting ProSe in f2. Similar to the RRC idle mode situation discussed above, the UE may support ProSe if the UE receives SIB18 and mode 2 or Type 1 Tx resource pool is configured. For example, the UE may be able to perform sidelink direct communication while in RRC idle mode or on cell other than a PCell in RRC connected mode. As another example, lower layers may be configured to transmit sidelink control information in resources indicated by a cell other than a PCell.

In one embodiment, if the UE receives ProSe SIB and the eNB corresponding to a cell on f2 indicates that the UE must enter RRC connected mode, the UE may send UE assistance information to the cell on f1 indicating that the UE wants to support ProSe on f2. If the serving eNB on f1 receives UE assistance information, the eNB can handover the UE to a cell in f2. The UE assistance information may include the desired target cell information (e.g., physical cell ID or frequency information). Alternatively, if the two cells belong to the same eNB, the eNB may, in one embodiment, allocate ProSe resources of f2 cell via RRC signaling from f1 cell. In one embodiment, the UE may provide a parameter that includes frequencies of interest to be used as a sidelink direct communication frequency. For example, the UE may set a carrier frequency to be a frequency of interest to be used as the sidelink direct communication frequency.

In one embodiment, if the UE receives ProSe SIB and the eNB corresponding to a cell on f2 indicates that the UE must enter RRC connected mode, the UE requests to release RRC connection to the eNB on f1. Once the UE goes into idle mode, the UE performs cell reselection and gives higher priority to f2 by which the UE selects the cell in f2. After cell reselection, the UE initiates an RRC connection setup procedure with the cell in f2.

After reselecting or being handed over to the cell on f2, the UE may establish an RRC connected mode with the eNB corresponding to the cell on f2. In some situations, there is a possibility that the cell in f2 that supports ProSe may handover the UE to the cell in f1, which does not support ProSe. This may be undesirable for a UE that desires to utilize ProSe. In order to avoid handover to the cell not supporting ProSe, a serving eNB may need to be informed by the UE regarding what frequencies that the UE can support for ProSe. In one embodiment, the UE sends ProSe support or interest indication for each supported band to the serving cell when the UE enables ProSe communication. Note that the UE may send a ProSe interest indication message even when it has performed ProSe communication to avoid network handover to frequencies not supporting ProSe.

For example, the below information may be added to an RRC message when the UE sends a resource allocation request for ProSe communication or discovery or in UE capability information:

```
proSeSupport ::= SEQUENCE (SIZE (1..maxBands)) OF ProSeSupport;
ProSeSupport ::=        SEQUENCE {
        proSeCommSupportonServing       BOOLEAN;
    OPTIONAL
        pro SeCommSupportNon-servingList    ProSeCommSupportNon-servingList;
    OPTIONAL
        proSeDisSupportonServing        BOOLEAN;
    OPTIONAL
        proSeDisSupportNon-servingList   proSeDisSupportNon-servingList;
    OPTIONAL
        ...
}
ProSeCommSupportNon-servingList ::= SEQUENCE (SIZE (1..maxBands)) OF ProSeSupport;
proSeDisSupportNon-servingList ::= SEQUENCE (SIZE (1..maxBands)) OF ProSeSupport;
ProSeSupport ::= SEQUENCE {
        proSeSupport        BOOLEAN;
        ...
}
``` proSeCommSupportonServing indicates that the UE can support ProSe communication when the corresponding frequency is a serving frequency in the supported band. proSeCommSupportNon-serving indicates frequency bands on which the UE can support ProSe communication while the UE camps on the supported band. If the UE can support ProSe in all supported frequency bands with a separate Rx/Tx chain, there may be only one value (BOOLEAN) instead of a list. proSeDisSupportonServing and proSeDisSupportNon-serving indicate ProSe support for discovery. The UE may send the ProSe support information for all the supported bands or may send the ProSe support information for the band associated to serving frequency band.

Figure 3:
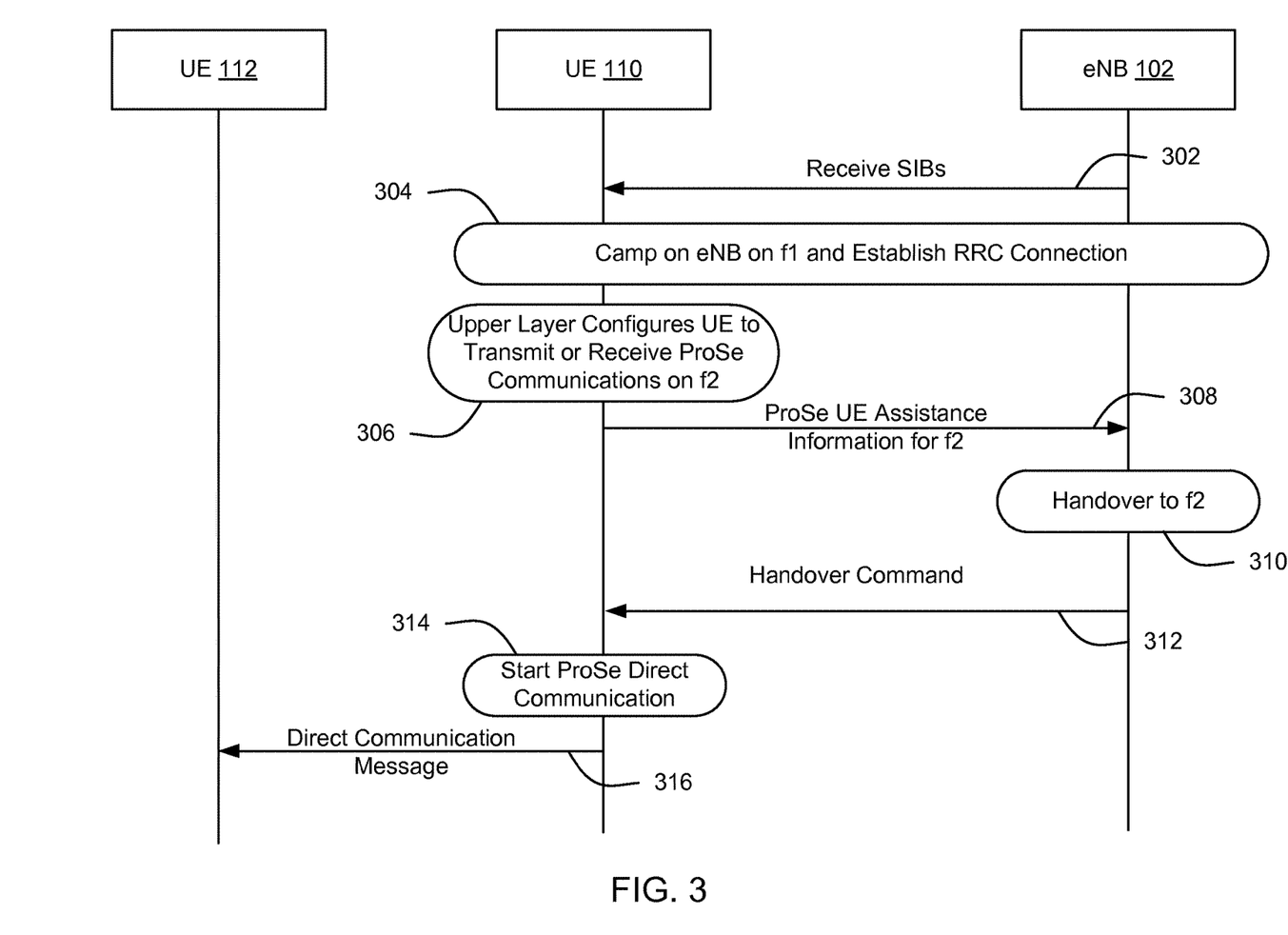
FIG. 3 is a schematic diagram illustrating a call flow for enabling proximity services consistent with embodiments disclosed herein.

FIG. 3 illustrates a call flow for enabling proximity services on a second frequency while a UE 110 is in an RRC connected mode on a first frequency, according to one embodiment. The call flow illustrates example communication between the first eNB 102, first UE 110, and second UE 112 of FIG. 1. For example, the first eNB 102 may provide communication services in a first frequency while ProSe are supported in a second frequency channel.

The UE 110 receives SIBs from the eNB 102 at 302. At 304, the UE 110 camps on the first eNB 102 in a first frequency channel f1 and establishes an RRC connected mode. At 306, an upper layer configures the UE 110 to transmit or receive ProSe communications on a second frequency channel f2. The UE 110 formats and sends UE assistance information, at 308, indicating that ProSe is supported or enabled by the UE on the second frequency channel f2. The eNB 102 initiates a handover procedure at 310 and sends a handover command 312 to handover the UE 110 to the second frequency channel. In response to receiving, decoding, and/or processing the handover command, the UE 110 performs a handover to a cell on the second frequency f2 and starts ProSe direct communication at 314. At 316, the UE 110 formats and sends a direct communication message to the UE 112 using the second frequency resource f2.

In one embodiment of a third case, a UE may be configured to enable proximity services in a SCell while the UE is in an RRC connected mode on a PCell. For example, the UE may enable ProSe while the UE is configured with carrier aggregation because a multicarrier capable UE is likely able to support carrier aggregation as well. However, depending on UE capability, the UE may or may not support carrier aggregation and ProSe simultaneously.

In one embodiment, an eNB maintains carrier aggregation configuration tracking whether a UE has triple Rx chains or supports time domain multiplexing (TDM) on a SCell. Generally, there will be no problem to support ProSe in a PCell. In one embodiment, if the UE supports ProSe on an SCell, the eNB allocates, via RRC signaling, ProSe-related RRC parameters to be used in the SCell.

In another embodiment, an eNB reconfigures the UE to stop carrier aggregation operation if the UE cannot support carrier aggregation and proximity services. The eNB may also change the PCell for the UE (e.g., via cell reselection or handover procedures) if the UE wants to support ProSe in a SCell frequency. In order for the eNB to know when or whether to reconfigure, the UE may indicate any limitations of carrier aggregation supported by the UE in relation to ProSe. In one embodiment, the UE indicates ProSe support or interest on a per band combination basis. For example, each band combination that supports ProSe in an SCell while supporting WAN in a PCell may be included. In one embodiment, the band combinations are included in UE assistance information sent to the eNB.

For example, the following information can be added in an RRC message when the UE sends, formats, or generates a resource allocation request for ProSe communication or discovery:

```
BandCombinationParameters-r12 ::= SEQUENCE (SIZE (1..maxSimultaneousBands-r10)) OF
BandParameters-r12
BandCombinationParametersExt-r12 ::= SEQUENCE {
    supportedBandwidthCombinationSet-r12    SupportedBandwidthCombinationSet-r12
    OPTIONAL
}
BandCombinationParameters-v12 ::= SEQUENCE (SIZE (1..maxSimultaneousBands-r10)) OF
BandParameters-v12
BandCombinationParameters-v12 ::= SEQUENCE {
    proSeCommSupportonServing BOOLEAN;
    OPTIONAL
    proSeCommSupportNon-servingList ProSeCommSupportNon-servingList;
    OPTIONAL
    proSeDisSupportonServing BOOLEAN;
    OPTIONAL
    proSeDisSupportNon-servingList proSeDisSupportNon-servingList;
    OPTIONAL
    ...
}
ProSeCommSupportNon-servingList ::=SEQUENCE (SIZE (1..maxBands)) OF ProSeSupport;
proSeDisSupportNon-servingList ::=SEQUENCE (SIZE (1..maxBands)) OF ProSeSupport;
ProSeSupport ::= SEQUENCE {
    proSeSupport BOOLEAN;
    ...
}
``` proSeCommSupportonServing indicates that the UE can support ProSe communication when the UE is configured with a supported band combination. proSeCommSupport-Non-serving indicates frequency bands on which the UE can support ProSe communication when the UE is configured with the supported band combination. If the UE can support ProSe in all supported frequency bands with a separate Rx/Tx chain, there may be only one value (BOOLEAN) instead of a list. proSeDisSupportonServing and proSeDis-SupportNon-serving indicates ProSe support for discovery. The UE may send the ProSe support information for all supported band combinations or for only band combination associated with serving frequency bands.

As another example, the below information may be added to an RRC message when the UE sends a resource allocation request for ProSe communication or discovery or in UE capability information to indicate ProSe support on a per band combination basis:

```
BandCombinationParameters-r12 ::= SEQUENCE (SIZE (1..maxSimultaneousBands-r10)) OF
BandParameters-r12
BandCombinationParametersExt-r12 ::= SEQUENCE {
    supportedBandwidthCombinationSet-r12    SupportedBandwidthCombinationSet-r12
    OPTIONAL
}
```

```
BandCombinationParameters- v12::= SEQUENCE (SIZE (1..maxSimultaneousBands-r10)) OF
BandParameters- v12
BandCombinationParameters-v12 ::= SEQUENCE {
    bandParameterList-r11        SEQUENCE (SIZE (1..maxSimultaneousBands-r10)) OF
BandParameters- v12 OPTIONAL,
    ...
}
BandParameters- v12::= SEQUENCE {
    proSeCommSupportonServing        BOOLEAN;
    OPTIONAL
    proSeCommSupportNon-servingList            ProSeCommSupportNon-servingList;
    OPTIONAL
    proSeDisSupportonServing BOOLEAN;
    OPTIONAL
    proSeDisSupportNon-servingList proSeDisSupportNon-servingList;
    OPTIONAL
    ...
}
ProSeCommSupportNon-servingList ::=SEQUENCE (SIZE (1..maxBands)) OF ProSeSupport;
ProSeSupport ::= SEQUENCE {
    proSeSupport        BOOLEAN;
    ...
}
``` proSeCommSupportonServing indicates that the UE can support ProSe communication when the UE is configured with the supported band combination. proSeCommSupportNon-serving indicates frequency bands on which the UE can support ProSe communication while the UE is configured with the supported band combination. If the UE can support ProSe in all supported frequency bands with a separate Rx/Tx chain, there may be only one value (BOOLEAN) instead of a list. proSeDisSupportonServing and proSeDisSupportNon-serving indicate ProSe support for discovery. This structure may be more suitable if a UE can support ProSe in certain band.

In one embodiment, the UE sends ProSe support information for all the supported band combinations or for the band combination associated to serving frequency bands. The UE may decide whether the UE supports ProSe based on own capability and/or whether the current detected cell for ProSe configures mode 2 transmission or Type 1 resource pool so that the UE can operate ProSe in parallel with WAN operation without eNB's control. The UE may send the ProSe support information for the frequency bands that the eNB requests to provide UE capability only.

Some further example embodiments are also considered. In one embodiment, a UE camps on a cell in a first frequency and enables proximity service on a cell in a second frequency. In one embodiment, a UE receives proximity service related system information on the cell in the second frequency. In one embodiment, the UE receives a transmission resource pool for an RRC idle mode in proximity service related system information. In one embodiment, the UE sends a direct communication data message or discovery message on the cell in the second frequency with the allocated resource pool in proximity service system information. In one embodiment, the UE detects that a transmission resource pool for proximity service related system information is absent in the idle mode. In one embodiment, the UE performs cell reselection to the cell in the second frequency when the proximity service related system information is absent. In one embodiment, the UE sends an RRC connection request to the cell in the second frequency. In one embodiment, the UE receives broadcasted system information in the first frequency containing a list of the current and/or neighboring carrier frequencies that provide proximity service. In one embodiment, a UE that is in an RRC connected mode and prioritizes ProSe communication of all indicated ProSe frequency above any of the unicast bearers generates and/or formats a ProSe interest indication message to include contents in accordance with its UE capability and or ProSe priority. In one embodiment, the UE submits the ProSe interest indication message to lower layers for transmission to an eNB.

The above examples and cases are given by way of explanation and illustration only. Any of the teaching provided in the first case, second case, or third case is, in at least some embodiments, applicable to the other cases.

Figure 4:
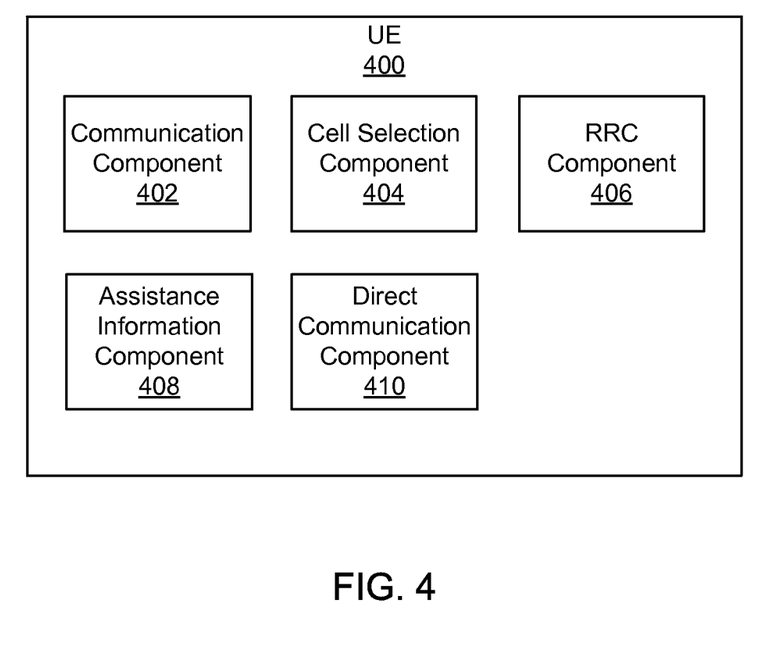
FIG. 4 is a schematic block diagram of a wireless communication device consistent with embodiments disclosed herein.

FIG. 4 is a schematic block diagram illustrating one embodiment of a UE 400. The UE 400 includes a communication component 402, a cell selection component 404, RRC component 406, an assistance information component 408, and a direct communication component 410. The components 402-410 are shown by way of example and may not all be included in all embodiments. In some embodiments, only one or any combination of two or more of the components 402-410 may be included software, firmware, and/or circuitry of the UE 400. In one embodiment, a baseband processor of the UE 400 may include one or any combination of two or more of the components 402-410.

The communication component 402 is configured to communicate with one or more other devices, such as peer UEs, or base stations, such as eNBs or wireless network nodes. In one embodiment, the communication component 402 may identify frequencies on which certain services are available. In one embodiment, the communication component 402 determines that proximity services are supported by a frequency resource different than a frequency resource used by a current serving cell. For example, the UE 400 may camp on a first cell using a first frequency and proximity services (D2D, direct communication) may be supported on a second frequency resource. In one embodiment, the first and second wireless frequency resources are within licensed spectrums corresponding to one or more mobile communications networks. For example, both frequency resources may correspond to licensed LTE spectrum for the same or different mobile network operators (MNOS).

In one embodiment, the communication component 402 is configured to determine which frequencies support proximity services based on an SIB received from a serving cell. For example, the serving cell may indicate that proximity services are supported in a frequency different than that used by the serving cell. In one embodiment, a first frequency resource is used by the serving cell and proximity services are supported in a second frequency resource. In one embodiment, the communication component 402 determines that proximity services are supported in the second frequency channel based on an SIB signal received from a non-serving cell. For example, the UE 400 may listen on a non-serving frequency to receive and decode the SIB. In one embodiment, the communication component 402 may determine which frequencies or cells support proximity services based on broadcasted system information received from both serving and non-serving cells.

In one embodiment, the communication component 402 is configured to process system information for an RRC idle mode from a second cell on the second frequency resource. For example, the system information may be available for decoding by any devices that are not in an RRC connected mode. In one embodiment, the system information may be received, processed, or decoded by the communication component 402 on a frequency other than a frequency of a current serving cell. In one embodiment, the system information includes proximity services information, such as whether proximity services are supported on specific frequencies.

In one embodiment, the communication component 402 is configured process the proximity services information to determine, or identify, a resource pool for proximity services allocated by the second cell. For example, the resource pool may indicate one or more time and/or frequency resources for D2D discovery or data communication. In one embodiment, any D2D discovery or data communication messages sent by the UE 400 may be sent within the frequency resource identified by the resource pool. In one embodiment, the communication component 402 is configured to process the system information to determine that the system information does not include a resource pool for proximity services. In one embodiment, the communication component 402 may determine that an RRC connected mode with a cell that is currently not the serving cell is required for direct communication resource allocation.

The cell selection component 404 is configured to perform cell selection or cell reselection to select a cell to use as a serving cell. In one embodiment, the cell selection component 404 is configured to perform cell selection and camp on a first cell in a first frequency resource. In one embodiment, the terms "camp" and "camping" on a cell are given to mean that the UE 400 receives control channel communications (such as SIB) from a base station operating in that cell. In one embodiment, the cell selection component 404 may select a serving cell which does not support proximity services. For example, the frequency used by the serving cell may not be available for proximity services. In one embodiment, the cell selection component 404 may perform cell reselection to select a different cell that is operating on a frequency resource that supports proximity services. In one embodiment, the cell selection component 404 may select a new cell in response to receiving, decoding, or processing a handover command from an eNB that is controlling the serving cell. For example, the cell selection component 404 and/or communication component 402 may establish an RRC connected mode with a second eNB using a second frequency channel that supports proximity services.

The RRC component 406 is configured to establish an RRC connection with an eNB or other base station that is a controller for a specific cell. In one embodiment, the RRC component 406 is configured to cause the UE 400 to send an RRC connection request to a cell to establish an RRC connected mode. In one embodiment, the RRC component 406 may establish an RRC connected mode with a cell different than a serving cell in order to receive D2D resource allocation information. For example, if the UE 400 is camping on a first cell the RRC component 406 may request to establish an RRC connected mode on a second cell. After establishing an RRC connected mode with the second cell, the RRC component 406 may enable proximity services and send one or more D2D discovery or data messages.

The assistance information component 408 is configured to send assistance information to a base station such as an eNB. For example, the assistance information component 408 may send any of the UE specific information or other assistance information discussed in the foregoing first, second or third case. In one embodiment, the assistance information component 408 is configured to cause the UE 400 to send a message that indicates that the UE supports direct communication on a one or more specific frequency channels. In one embodiment, the assistance information may include band combination parameters that indicate frequencies on which the UE 400 supports network communication when proximity services are enabled on one or more specific frequency channels. For example, if the UE 400 supports carrier aggregation, the band combination parameters may indicate which combinations of frequencies are supported to allow the UE 400 to send and/or receive information simultaneously on different frequencies.

The direct communication component 410 is configured to perform D2D discovery, D2D data communication, or other proximity services. In one embodiment, the direct communication component 410 is configured to start D2D communication on a frequency resource that is different than a current serving cell frequency. In one embodiment, the direct communication component 410 is configured to cause the UE 400 to send a D2D message in a frequency resource, such as a sidelink frequency resource. The D2D message may include either a D2D discovery message or a D2D data communication message. In one embodiment, the direct communication component 410 is configured to start direct communication in response to cell reselection to a cell that supports proximity services and/or in response to decoding a handover command from an eNB.

Figure 5:
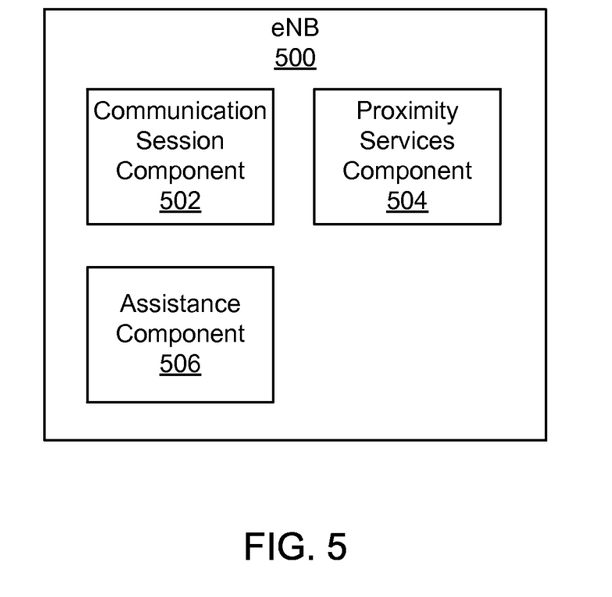
FIG. 5 is a schematic block diagram of a base station consistent with embodiments disclosed herein.

FIG. 5 is a schematic block diagram illustrating one embodiment of an eNB 500. The eNB 500 includes a communication session component 502, a proximity services component 504, and an assistance component 506. The components 502-506 are shown by way of example and may not all be included in all embodiments. In some embodiments, only one or any combination of two or more of the components 502-506 may be included as part of software, firmware, and/or circuitry of the eNB 500.

The communication session component 502 is configured to establish and/or manage communication sessions with one or more UEs within one or more cell coverage areas corresponding to the eNB 500. In one embodiment, the communication session component 502 is configured to establish a communication session in a first frequency with a UE. The communication session component 502 may then handover or release the communication session with the first UE to allow the first UE to select a cell where proximity services are supported (e.g., the new cell may use a different frequency in which direct communications are supported).

In one embodiment, the communication session component 502 may send a handover command or release an RRC connection with the first UE to allow the first UE to perform cell reselection to select a base station operating in a frequency that supports proximity services, or in which the first UE supports proximity services. In one embodiment, the communication session component 502 may handover or release the first UE in response to receiving an indication from the first UE that it supports proximity services in a frequency different than a current serving cell corresponding to the eNB 500.

The proximity services component 504 is configured to provide information regarding frequencies or cells that support proximity services. In one embodiment, the proximity services component 504 provides to the first UE an indication that proximity services are not supported in a first frequency served by the eNB. For example, the first frequency may correspond to a frequency in which a UE has established an RRC connection. In one embodiment, the proximity services component 504 provides to the first UE an indication of one or more frequencies that support proximity services. For example, the proximity services component 504 may indicate that proximity services are not supported in a first frequency but are supported in a second frequency. The second frequency may correspond to a frequency that corresponds to a different cell of the same or a different eNB, or may correspond to a frequency that is outside network coverage for the UE. In one embodiment, the indications of which frequencies do or do not support proximity services may be included within a same message. The message may include an RRC connected mode message or may include a broadcasted message, such as an SIB.

The assistance component 506 receives, processes, or decodes assistance information from a UE. In one embodiment, the assistance component 506 is configured to determine that a UE supports proximity services on a specific frequency based on a message received from the first UE that indicates one or more frequency resources on which the UE supports proximity services. In one embodiment, the assistance component 506 receives assistance information that include band combination parameters that indicate frequencies on which network communication is supported while proximity services are enabled on one or more specific frequencies. The assistance component 506 may determine the capabilities or needs of a specific UE based on the information received from that specific UE. The communication session component 502 and the proximity services component 504 may be able to provide services based on the capabilities or needs of the UE as determined by the assistance component.

Figure 6:
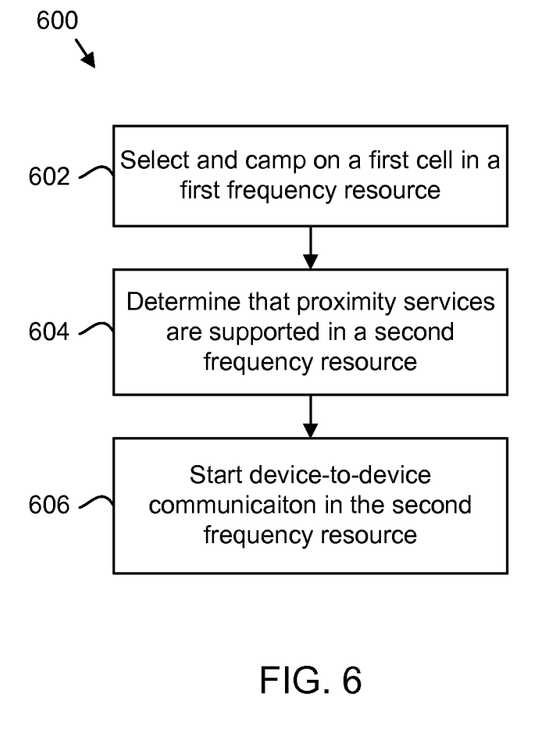
FIG. 6 is a schematic flow-chart diagram illustrating a method for starting device-to-device communication consistent with embodiments disclosed herein.

FIG. 6 is a schematic flow chart diagram illustrating a method 600 for enabling proximity services. In one embodiment, the method 600 is performed by a wireless communication device, such as the UE 400 of FIG. 4.

The method 600 begins and a cell selection component 404 performs 602 cell selection (or reselection) and camps on a first cell in a first frequency resource. A communication component 402 determines 604 that proximity services are supported in a second frequency resource. In one embodiment, the first and second wireless frequency resources are within licensed spectrums corresponding to one or more mobile communications networks, such as networks that provide LTE communication services. A direct communication component 410 starts 606 D2D communication on the second frequency resource. The direct communication component 410 may also send a D2D message in the second frequency resource. The D2D message comprises one of a D2D discovery message and a D2D communication message.

Figure 7:
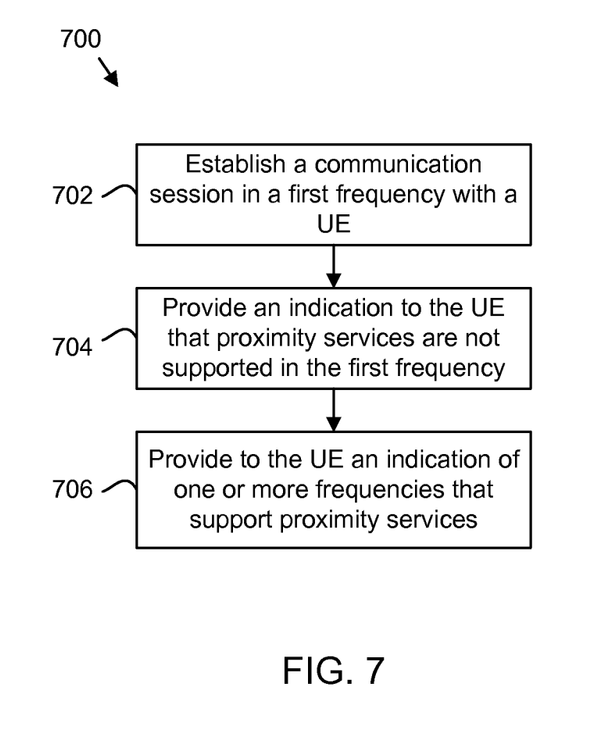
FIG. 7 is a schematic flow-chart diagram illustrating a method for providing proximity services related information to a wireless communication device consistent with embodiments disclosed herein.

FIG. 7 is a schematic flow chart diagram illustrating a method 700 for providing proximity services related information to a UE. In one embodiment, the method 700 is performed by a base station, such as the eNB 500 of FIG. 5.

The method 700 begins and a communication session component 502 causes the eNB 500 to establish 702 a communication session in a first frequency with a UE. A proximity services component 504 provides 704 to the UE an indication that proximity services are not supported in the first frequency and further provides 706 to the UE an indication of one or more frequencies that support proximity services. In one embodiment, the eNB 500 may also receive assistance information from the UE that indicates that the UE supports proximity services in a second frequency. The eNB 500 may release a connection with the UE or handover the UE to a cell that uses the second frequency.

Figure 8:
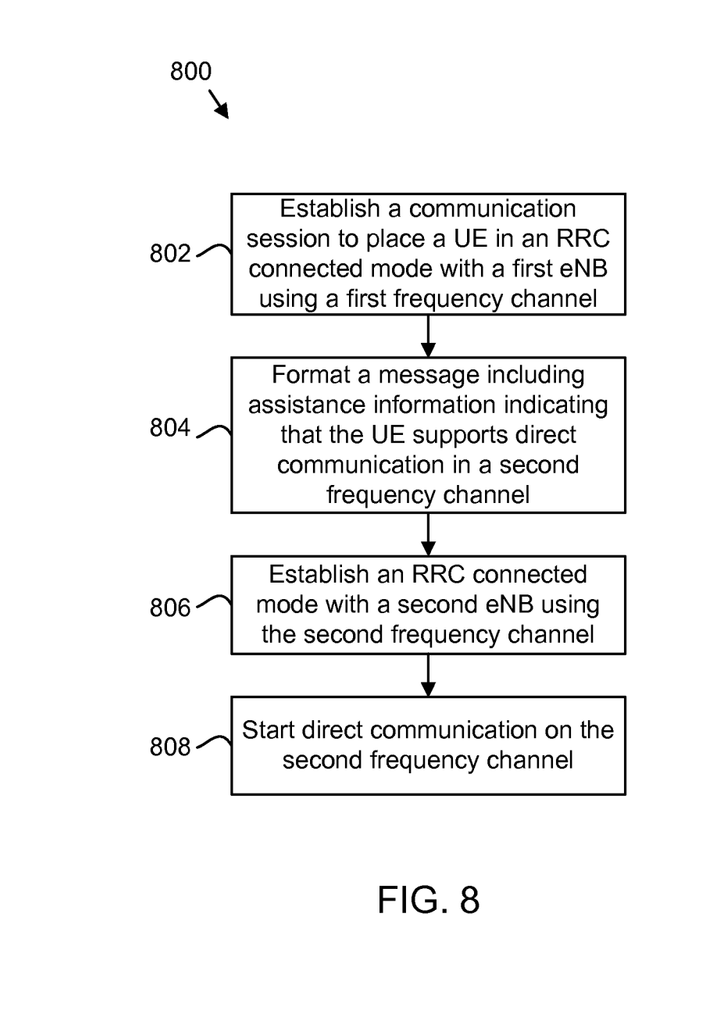
FIG. 8 is a schematic flow-chart diagram illustrating another method for starting device-to-device communication consistent with embodiments disclosed herein.

FIG. 8 is a schematic flow chart diagram illustrating a method 800 for enabling proximity services. In one embodiment, the method 800 is performed by a wireless communication device, such as the UE 400 of FIG. 4.

The method 800 begins and an RRC component 406 establishes 802 an RRC communication session to place a UE in an RRC connected mode with a first eNB using a first frequency channel. An assistance information component 408 formats 804 and/or encodes a message that includes assistance information for the UE to send to the first eNB. In one embodiment, the assistance information indicates that the UE supports direct communication on a second frequency channel. A cell selection component 404 establishes 806 an RRC connected mode with a second eNB using the second frequency channel. In one embodiment, the cell selection component 404 establishes 806 the RRC connected mode with the second eNB in response to decoding a handover command from the first eNB or in response to performing cell reselection to select the second eNB. In one embodiment, the first eNB and the second eNB comprise the same eNB that is serving different cells using different frequencies. A direct communication component 410 starts 808 direct communication on the second frequency channel. For example, the direct communication component 410 may start 808 direct communication in response to decoding the handover command or in response to performing cell reselection to select the second eNB. In one embodiment, the direct communication component 410 may start 808 direct communication by sending a D2D discovery or D2D data communication message.

Figure 9:
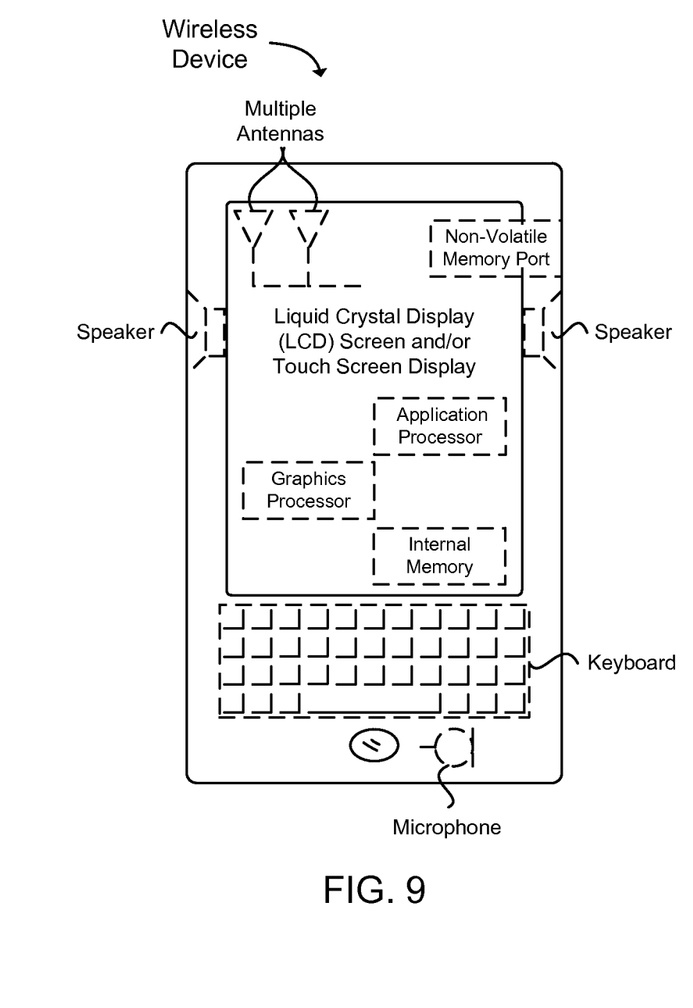
FIG. 9 is a schematic diagram of a mobile device consistent with embodiments disclosed herein.

FIG. 9 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen. The screen and/or an input device, such as the keyboard or touch screen, may provide a user input interface for a user to interact with the mobile device.

EXAMPLES

The following examples pertain to further embodiments.

Example 1 is a method for enabling proximity services on a UE. The method includes performing cell selection or reselection and camping on a first cell in a first frequency wherein the first cell is the serving cell. The method includes determining that proximity services are supported in a second frequency. The method includes starting device-to-device communication on the second frequency and sending, with a transceiver, a device-to-device message in the second frequency, wherein the device-to-device message comprises one of a device-to-device discovery message and a device-to-device communication message.

In Example 2, the method of Example 1 further includes processing system information for a RRC idle mode from a second cell on the second frequency, wherein the system information includes proximity services information.

In Example 3, processing the proximity services information in Example 2 includes processing the proximity services information to determine a resource pool for proximity services allocated by the second cell, wherein the device-to-device message is sent in the second frequency.

In Example 4, processing the system information in Example 4 includes processing the system information to determine that the system information does not include a resource pool for proximity services.

In Example 5, the method of Example 4 further includes performing intra-frequency cell selection or reselection to select a second cell operating on the second frequency.

In Example 6, the method of Example 5 further include sending an RRC connection request to the second cell, wherein the device to device message is sent in response to the RRC connection request.

In Example 7, the method of any of Examples 1-6 further includes identifying one or more carrier frequencies that support proximity services based on broadcasted system information received from the first cell in the first frequency, wherein the one or more carrier frequencies comprise the second frequency.

In Example 8, the method of any of Examples 1-7 further includes sending a message indicating the UE is interested to support proximity services on the second frequency.

Example 9 is a method comprising establishing, at an eNB, a communication session in a first frequency with a first UE. The method includes providing to the first UE, from the eNB, an indication that proximity services are not supported in the first frequency. The method includes providing to the first UE an indication of one or more frequencies that support proximity services, wherein the one or more frequencies comprise a second frequency.

In Example 10, the method of Example 9 includes transmitting, from the eNB, a message in the first frequency that includes one or more of the indication that proximity services are not supported in the first frequency and the indication of the one or more frequencies that support proximity services, wherein the message comprises one or more of a RRC message and a SIB message.

In Example 11, the method of any of Examples 9-10 further includes determining that the first UE supports proximity services on the second frequency based on a message received from the first UE that indicates one or more frequency resources on which the UE supports proximity services, wherein the one or more frequency resources comprise the second frequency.

In Example 12, the message received from the first UE of any of Examples 10-11 further includes band combination parameters that indicate frequencies on which network communication is supported while proximity services are enabled on the second frequency.

In Example 13, the method of any of Examples 9-12 further includes one or more of: sending a handover command to handover the first UE to a cell operating in the second frequency; and releasing an RRC connection with the first UE to allow the first UE to perform cell reselection to select a base station operating in the second frequency.

Example 14 is a method that includes establishing a RRC communication session to place a UE in a RRC connected mode with a first eNB using a first frequency. The method includes formatting a message that includes assistance information for the UE to send to the first eNB, the assistance information indicating that the UE wants to enable direct communication on a second frequency. The method includes starting direct communication on the second frequency in response to a handover to a second eNB using the second frequency.

In Example 15, method of Example 14 further includes determining that proximity services are supported in the second frequency channel based on a system information block (SIB) signal received from an second eNB operating in the second frequency In Example 16, the method of any of Examples 14-15 includes determining that the RRC connected mode with the second eNB is required for direct communication resource allocation.

In Example 17, the method of any of Examples 14-16 includes determining that proximity services are supported in the second wireless frequency resource based on a SIB signal received from the first eNB in the first wireless frequency resource, wherein the SIB signal indicates one or more frequency resources that support proximity services, the one or more frequency resources comprising the second frequency.

Example 18 is processor, such as a based band processor, that includes logic to perform a method or realize an apparatus as in any of Examples 1-8 and 14-17.

Example 19 is an apparatus, such as a UE, that includes means to perform a method or realize an apparatus as in any of Examples 1-8 and 14-18.

Example 19 is an apparatus or system, such as an eNB, that includes means to perform a method or realize an apparatus as in any of Examples 8-13.

Example 20 is a machine readable storage including machine-readable instructions, when executed, to implement a method or realize an apparatus as in any of Examples 1-19.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) configured to:
  perform cell selection or reselection and camp on a first cell in a first frequency and place the UE in a first radio resource control (RRC) connected mode with the first cell, wherein the first cell is the serving cell, wherein the first cell supports wide area network operation on the first frequency;
  determine that proximity services are supported in a second frequency based on system information including proximity services information from the first cell or a second cell, wherein the second cell is a non-serving cell;
  request to release from the first RRC connected mode and enter an RRC idle mode on the first cell using the first frequency;
  perform cell selection or reselection on the second frequency when the UE enters the RRC idle mode with the first cell on the first frequency based on the determination that proximity services are supported on the first cell or the second cell to establish proximity service communication in a second RRC connected mode with the first cell or the second cell on the second frequency while camping on the first cell on the first frequency in the RRC idle mode,
wherein the UE establishes the proximity service communication with the first cell or the second cell on the second frequency without being handed over by the first cell on the first frequency;
maintain wide area network operation on the first cell in the RRC idle mode using the first frequency while receiving proximity service support from the first cell or the second cell in the second RRC connected mode on the second frequency;
start device-to-device communication on the second frequency and send, with a transceiver, a device-to-device message in the second frequency, wherein the device-to-device message comprises one of a device-to-device discovery message and a device-to-device communication message; and
send or receive a wide area network communication on the first cell on the first frequency while sending or receiving the proximity service communication on the first cell or the second cell on the second frequency.

2. The UE of claim 1, wherein the UE is further configured to process the system information for a RRC idle mode from the second cell on the second frequency.

3. The UE of claim 2, wherein the UE is configured to process the proximity services information to determine a resource pool for proximity services allocated by the second cell, wherein the proximity services information is sent in the second frequency.

4. The UE of claim 2, wherein the UE is further configured to cause the UE to process the system information to determine that the system information does not include a resource pool for proximity services.

5. The UE of claim 4, wherein the UE is further configured to perform intra-frequency cell selection or reselection to select a second cell operating on the second frequency.

6. The UE of claim 5, wherein the UE is further configured to send an RRC connection request to the second cell, wherein the device-to-device message is sent in response to entering the second RRC connected mode.

7. The UE of claim 1, wherein the UE is further configured to identify one or more carrier frequencies that support proximity services based on broadcasted system information received from the first cell in the first frequency, wherein the one or more carrier frequencies comprise the second frequency.

8. The UE of claim 1, wherein the one or more processors are further configured to cause the UE to send a message indicating the UE is interested to support proximity services on the second frequency.

9. The UE of claim 1, wherein the proximity service support comprises a system information block from the first cell or the second cell on the second frequency, wherein the system information block comprises information about device-to-device resource allocation for discovery or communication.

10. An Evolved Universal Terrestrial Radio Access Network (E-UTRAN) Node B (eNB) comprising:
one or more processors;
computer readable media in communication with the one or more processors, the computer readable media storing executable instructions that, when executed by the one or more processors, cause the eNB to:
establish a first radio resource control (RRC) communication session in a first frequency with a first user equipment (UE) in RRC connected mode, wherein the eNB supports wide area network operation on the first frequency;
provide to the first UE an indication that proximity services are not supported in the first frequency;
provide to the first UE an indication of one or more frequencies that support proximity services, wherein the one or more frequencies comprise a second frequency;
release the first UE from RRC connected mode and enter RRC idle mode with the first UE on the first cell using the first frequency;
allocate proximity resources on the second frequency; and
establish a second RRC communication channel in RRC connected mode on the second frequency to establish proximity service communication with the first UE on the second frequency while camping on the first frequency in RRC idle mode without handing over the UE on the first frequency;
maintain wide area network operation with the first UE using the first frequency in RRC idle mode while conducting proximity service support with the first UE on the second frequency in RRC connected mode; and
send or receive a wide area network communication on the first cell on the first frequency while sending or receiving the proximity service communication on the first cell or the second cell on the second frequency.

11. The eNB of claim 10, wherein the executable instructions cause the eNB to transmit a message in the first frequency that includes one or more of the indication that proximity services are not supported in the first frequency and the indication of the one or more frequencies that support proximity services.

12. The eNB of claim 11, wherein the message comprises an RRC message.

13. The eNB of claim 11, wherein the message comprises a system information block (SIB) message.

14. The eNB of claim 10, wherein the executable instructions further cause the eNB to determine that the first UE supports proximity services on the second frequency based on a message received from the first UE that indicates one or more frequency resources on which the UE supports proximity services, wherein the one or more frequency resources comprise the second frequency.

15. The eNB of claim 14, wherein the message received from the first UE further comprises band combination parameters that indicate frequencies on which network communication is supported while proximity services are enabled on the second frequency.

16. The eNB of claim 10, wherein the executable instructions further cause the eNB to send a handover command to handover the first UE to a cell operating in the second frequency.

17. The eNB of claim 10, wherein the executable instructions further cause the eNB to release an RRC connection with the first UE to allow the first UE to perform cell reselection to select a base station operating in the second frequency.

18. A baseband processor of a user equipment (UE) comprising:
a radio resource control (RRC) component configured to establish a first RRC communication session and place the UE in RRC connected mode with a first Evolved Universal Terrestrial Radio Access Network (E-UTRAN) Node B (eNB) using a first frequency, wherein the first eNB supports wide area network operation on the first frequency;

a communication component configured to determine that proximity services are supported in the second frequency channel based on a system information block (SIB) signal received from a second eNB operating in the second frequency, wherein the UE:

requests to release from RRC connected mode with the first eNB and enter RRC idle mode on the first eNB using the first frequency, and     performs cell selection or reselection on the second frequency based on the determination that proximity services are supported on the second eNB to establish a second RRC communication session to place the UE in RRC connected mode to establish proximity service communication with the second eNB on the second frequency while camping on the first eNB on the first frequency in the RRC idle mode;

an assistance information component configured to format a message comprising assistance information for the UE to send to the first eNB, the assistance information indicating that the UE wants to enable direct communication on a second frequency; and a direct communication component configured to:

start direct communication on the second frequency on the second eNB in RRC connected mode in response to a handover command to a second eNB using the second frequency without being handed over by the first eNB on the first frequency, and maintain the wide area network operation with the first eNB on the first frequency in RRC idle mode while receiving proximity service support from the second eNB on the second frequency in RRC connected mode; and     send or receive a wide area network communication on the first eNB on the first frequency while sending or receiving the proximity service communication on the second eNB on the second frequency.

19. The baseband processor of claim 18, wherein the communication component is further configured to determine that the second RRC connected mode with the second eNB is required for direct communication resource allocation.

20. The baseband processor of claim 18, wherein the communication component is further configured to determine that proximity services are supported in the second wireless frequency resource based on a system information block (SIB) signal received from the first eNB in the first wireless frequency resource, wherein the SIB signal indicates one or more frequency resources that support proximity services, the one or more frequency resources comprising the second frequency.

* * * * *